Patented June 21, 1927.

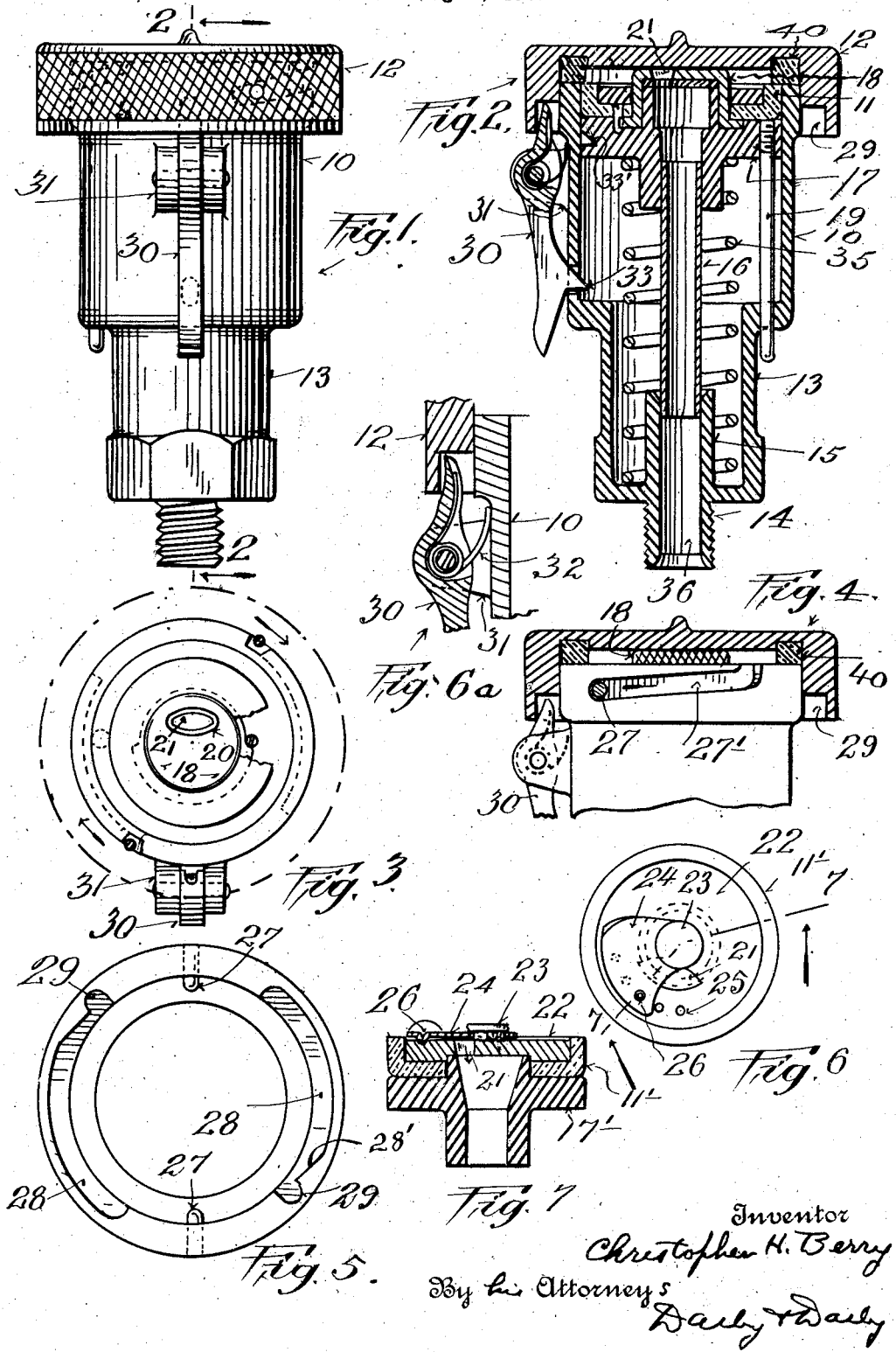

1,632,872

UNITED STATES PATENT OFFICE.

CHRISTOPHER H. BERRY, OF NEWARK, NEW JERSEY.

AUTOMATIC GREASE CUP.

Application filed August 4, 1925. Serial No. 48,059.

This invention relates to a new and improved type of grease cup which is designed to automatically feed the lubricant to a bearing surface as it is needed. Another object of the invention includes the provision of a simple, rugged and efficient lubricating cup wherein provision is made for quickly replenishing the lubricant and which is provided with means for readily regulating the rate of lubricating thereby preventing waste of lubricant and greasy machinery. Another object includes the provision of a quickly releasable cap and a cooperating cover controlled lock for automatically releasing the grease ejecting plunger. I also provide a cover lock and an indicating device for at all times showing the supply of grease in the cup.

Other objects will appear hereinafter and I attain these results by the construction shown in the accompanying drawing in which Fig. 1 is a side elevation of a construction which embodies the principles of my invention.

Fig. 2 is a view taken on the line 2—2 of Fig. 1.

Fig. 3 is a plan view with the cap removed.

Fig. 4 is a view showing the cap lock and the automatic plunger release.

Fig. 5 is a plan view of the cover from the under side.

Fig. 6 is a view of a modified form of lubricant regulating mechanism,

Fig. 6ª is an enlarged sectional detail of parts 30 and 31 of Fig. 2.

Fig. 7 is a view taken on the line 7—7 of Fig. 6.

Like numerals refer to similar parts throughout the several views.

The prime purpose of my present invention includes an efficient but simple construction which is very reliable and wherein the cost of manufacture has been greatly reduced. To this end, I provide a cup body 10 of proper capacity for the reception of an appropriate lubricant as hard oil, or the like, which is supplied to the cup between the plunger head or cup washer 11 and the cover 12. In a preferred form of construction, the cup 10 is provided with an offset or restricted base 13 and a threaded stem 14. The stem 14 is hollow for the passage of grease to the bearing surface (not shown) of the journal or journal box to be lubricated.

The passage in stem 14 continues within the restricted base 13 as a cylindrical guide 15 for the hollow piston stem 16. This stem carries the piston head 17 on which is fitted the lubricant controlling cap 18 and the cup washers 11. The piston head 17 is provided with an index pin or stem 19, which projects from the cup 10 through an aperture to indicate the position of the piston and consequently to show the amount of grease in the cup. The lubricant controlling cap 18 is provided with an elongated orifice 20 which registers with a corresponding aperture 21 in a plate therebeneath so that by rotating the cap 18 the effective lubricating feed will be regulated. This regulation is accomplished by properly setting the cap before the cup is filled.

In Figs. 6 and 7, I have shown another type of lubricant regulating feed. In this construction, the piston head 17' is provided with a cup washer 11' which is provided with a slotted plate 22 having a boss 23 on which is the regulating plate 24. The position of plate 24 is determined by seats 25 and a holding projection 26.

The cover 12 is a quickly seating and automatically locking construction. The cover is provided with oppositely placed seating pins 27 which engage slots 27' in the rim of the cup 10. Cover 12 is provided with a catch controlling slot 28, having a seat 29 for engaging the upper end of the trigger of the latch 30. These slots and seats are duplicated for ease in applying the cap (see Fig. 5). The latch is carried on ears 31 and the lower end thereof is urged inwardly by a spring 32 so that the trigger catch 33 normally extends into the path of the piston head 17, to hold the same in depressed position for filling the cup. A spring 35 on the piston stem 16 tends to press the piston against the lubricant and thus urge it in regulated quantities through the feed port 36 in stem 14. A gasket 40 prevents the escape of lubricant when the cover is in closed position.

The cup is readily filled as follows: The upper end of the trigger latch 30 is disengaged from its seat 29 by depressing this end. The cover is then turned and removed. The piston is now depressed until the catch 33 engages the notch 33' in the piston head 17. The cup is filled with grease or hard oil. The cover is then applied so that the seating pins 27 engage slots 27' and by turning the cover into locked position, the catch 33 is disengaged from the plunger head 11 because the cam surface 28' in slot 28 engages and depresses the upper end of the trigger catch 33. The spring 35 now urges the piston upwards and causes the lubricant to be gradually fed through the regulating device and through the feed port 36 as required.

From the disclosure herein given, it will be apparent that my device is very simple in construction. It is easily and quickly refilled. There is practically no loss or waste of lubricant and the cup is not liable to get out of order or to be damaged by usage.

What I claim as new and useful, of my own invention and desire to secure by Letters Patent, is:

1. A grease cup comprising a cup body open at the top and having a stem with a restricted passage therethrough a piston in said cup, said piston having a hollow stem and a lubricant regulating device for controlling the flow of the lubricant through said stems, means on said cup body for engaging said piston to hold the same in depressed position while the cup is being filled, and a cover for said cup, said cover having a cam surface for releasing the piston engaging means.

2. A grease cup comprising a cup body open at the top and having a stem with a passage therethrough, a piston in said cup, a grease regulating device on said piston, an ear on said cup, a trigger latch carried by said ear for engaging said piston, a cover for said cup and means on said cover for releasing said trigger latch.

3. A grease cup comprising a cup body open at the top and having a restricted passage, a piston in said cup, a catch on said cup extending into the cup to engage the piston, means for urging said piston against the lubricant in the cup body, a cap for said cup, said cap having bayonet locks for quickly locking or releasing the cap and cam surfaces on said cap for controlling the catch.

4. In a lubricating cup the combination of a spring pressed piston, a trigger latch for said piston, a cover for said cup and means on said cover for releasing the trigger latch as the cover is locked onto the cup.

5. In an automatic lubricating cup, a cup body having a restricted base and a threaded stem, said stem having an aperture and a pipe extension extending into the cup body, a stem telescoping in said pipe extension, a piston on said stem, a trigger catch for engaging said piston and a cover for said cup, said cover having a cam surface for depressing the trigger to disengage the plunger as the cap is locked onto the cup.

In testimony whereof I have hereunto set my hand on this 30th day of July A. D., 1925.

CHRISTOPHER H. BERRY.